US009614951B2

(12) United States Patent
Nurmi (10) Patent No.: US 9,614,951 B2
(45) Date of Patent: Apr. 4, 2017

(54) METHOD, APPARATUS AND COMPUTER PROGRAM PRODUCT FOR ANALYZING DATA ASSOCIATED WITH PROXIMATE DEVICES (75) Inventor: Mikko Antero Nurmi, Tampere (FI)

(73) Assignee: NOKIA TECHNOLOGIES OY, Espoo (FI)

(*) Notice: Subject to any disclaimer, the term of this patent is extended or adjusted under 35 U.S.C. 154(b) by 965 days.

(21) Appl. No.: 12/275,590

(22) Filed: Nov. 21, 2008

(65) Prior Publication Data
US 2010/0130125 A1 May 27, 2010

(51) Int. Cl.
H04B 7/00 (2006.01)
H04M 1/725 (2006.01)
H04B 17/23 (2015.01)
H04B 17/27 (2015.01)

(52) U.S. Cl.
CPC .......... *H04M 1/7253* (2013.01); *H04B 17/23* (2015.01); *H04B 17/27* (2015.01); *H04M 2250/10* (2013.01)

(58) Field of Classification Search
CPC .......... H04B 17/0065; H04B 17/0072; H04M 1/7253; H04M 2250/10
See application file for complete search history.

(56) References Cited

U.S. PATENT DOCUMENTS

| 6,622,018 | B1* | 9/2003 | Erekson | 455/420 |
|---|---|---|---|---|
| 7,653,655 | B2* | 1/2010 | Tokoro et al. | 455/41.2 |
| 7,668,124 | B2* | 2/2010 | Karaoguz | 370/310 |
| 2004/0048570 | A1* | 3/2004 | Oba | G06F 1/1626 455/41.1 |
| 2006/0161621 | A1* | 7/2006 | Rosenberg | 709/204 |
| 2007/0146347 | A1* | 6/2007 | Rosenberg | 345/173 |
| 2007/0233759 | A1* | 10/2007 | Tomlinson | G06F 17/30017 708/200 |
| 2008/0207115 | A1* | 8/2008 | Lee et al. | 455/3.06 |
| 2008/0280600 | A1* | 11/2008 | Zhou | G06F 17/3087 455/415 |
| 2009/0024463 | A1* | 1/2009 | Szeto | 705/14 |
| 2009/0082040 | A1* | 3/2009 | Kahn | 455/457 |
| 2009/0119273 | A1* | 5/2009 | Nagasaka et al. | 707/4 |
| 2009/0160731 | A1* | 6/2009 | Schuler et al. | 345/1.1 |
| 2009/0243957 | A1* | 10/2009 | Ni et al. | 345/1.1 |
| 2011/0117841 | A1* | 5/2011 | Thorn et al. | 455/41.2 |
| 2013/0095762 | A1 | 4/2013 | Inagaki et al. | |

FOREIGN PATENT DOCUMENTS

CN 15500086 A 11/2004

OTHER PUBLICATIONS

Office Action with English Summary of Chinese Application No. 200910220890.6, dated Feb. 5, 2013, pp. 1-6.

* cited by examiner

Primary Examiner — Zhiyu Lu
(74) Attorney, Agent, or Firm — Ditthavong & Steiner, P.C.

(57) ABSTRACT

An apparatus for analyzing data associated with proximate devices may include a processor. The processor may be configured to detect that a first device is proximate to a second device and receive indications of active data directly from the first device. The processor may also be configured to perform an analysis of the indications of active data and cause a user interface to present results of the analysis. Associated methods and computer program products may also be provided.

27 Claims, 6 Drawing Sheets

METHOD, APPARATUS AND COMPUTER PROGRAM PRODUCT FOR ANALYZING DATA ASSOCIATED WITH PROXIMATE DEVICES

TECHNICAL FIELD

Embodiments of the present invention relate generally to analyzing data, and, more particularly, relate to a method, apparatus, and a computer program product for analyzing data associated with proximate devices.

BACKGROUND

The modern communications era has brought about a tremendous expansion of wireline and wireless networks. Various types of networking technologies have been developed resulting in unprecedented expansion of computer networks, television networks, telephony networks, and the like, fueled by consumer demand. Wireless and mobile networking technologies have addressed related consumer demands, while providing more flexibility and immediacy of information transfer.

Current and future networking technologies continue to facilitate ease of information transfer and convenience to users by expanding the capabilities of mobile electronic devices and other computing devices. The functionality of mobile communications devices continues to expand and, as a result, mobile communications devices have become ubiquitous in both business and personal settings. As the functionality of mobile communications devices and the ease of information transfer continues to increase, users continue to demand more functionality that allows the users to quickly find and interact with more data in unique ways.

Further, memory devices that may be utilized with mobile communications devices continue to evolve, such that the memory devices are smaller in size, but capable of storing more data. Due to the vast increases in the storage capacity of memory devices that may be used by mobile communications devices, users of these devices are storing increasing amounts of data on the device. For example, many users now store media content, such as photos, videos, audio files and the like, correspondence information such as email, short message service (SMS) messages and the like, and contact information of business acquaintances, friends, and family. With this massive amount of data literally at their fingertips, users of mobile communication devices continue to demand new ways to interact with this data, share this data, and the like.

BRIEF SUMMARY

A method, apparatus, and computer program product are described that analyze data associated with proximate devices. In this regard, a mobile communications device may be configured to detect that it is located proximate to another mobile communications device. For example, the mobile communications device may detect that it is adjacent to another mobile communications device. Proximity detection may be performed by detecting that a near field communication channel has been opened between the devices, or based on the relative locations of the devices determined using, for example, global positioning system (GPS) coordinates or other means. Upon detection that another device is proximate, indications of active data from the other device may be received. The active data may be data being currently presented to a user of the other device, such as an audio or video file being played, data being used by a currently running application, or the like. After receipt of the indications of active data, the device may be configured to perform an analysis, such as a search, of the indications of active data and display the results.

An effect of some example embodiments of the invention is to provide a means for searching data on a mobile communications device based on data of another communications device. This has the advantage of identifying data that may be common to both devices (e.g., union data), or data that is not common to both devices (e.g., differences in data between the devices or complimentary data). Example embodiments of the present invention provide simplified means for users to identify and potentially share data of interest to the users. Further, example embodiments also provide unique means for displaying representations of analysis results, such as moving representations or icons across a display in the direction of another device to indicate, for example, that the other device also has the same or related results stored therein.

In this regard, in one example embodiment, a method for analyzing data associated with proximate devices is provided. The example method may include detecting that a first device is proximate to a second device and receiving indications of active data from the first device. The example method may also include performing an analysis of the indications of active data, wherein the analysis may be preformed by a processor configured to perform the analysis. Further, the example method may include causing a user interface to present results of the analysis.

In another example embodiment, an apparatus for analyzing data associated with proximate devices is provided. The apparatus may include a processor. The processor may be configured to detect that a first device is proximate to a second device, and receive indications of active data from the first device. The processor may be further configured to perform an analysis of the indications of active data, and cause a user interface to present results of the analysis.

In another example embodiment, a computer program product for analyzing data associated with proximate devices is provided. The computer program product may include one or more computer-readable storage mediums having executable computer-readable program code instructions stored therein. The computer-readable program code instructions may be configured to detect that a first device is proximate to a second device, and receive indications of active data from the first device. The computer-readable program code instructions may be further configured to perform an analysis of the indications of active data, and cause a user interface to present results of the analysis.

In yet another example embodiment, an apparatus for analyzing data associated with proximate devices is provided. The example apparatus may include means for detecting that a first device is proximate to a second device and means for receiving indications of active data from the first device. The example apparatus may further include means for performing an analysis of the indications of active data, and means for causing a user interface to present results of the analysis.

BRIEF DESCRIPTION OF THE DRAWING(S)

Having thus described the invention in general terms, reference will now be made to the accompanying drawings, which are not necessarily drawn to scale, and wherein:

DETAILED DESCRIPTION

Embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received, operated on, and/or stored in accordance with embodiments of the present invention. As used herein, the phrase software version may refer to a version of an entire software application or merely a portion or component of a software application. Moreover, the term "exemplary," as used herein, is not provided to convey any qualitative assessment, but instead to merely convey an illustration of an example.

Figure 1A:
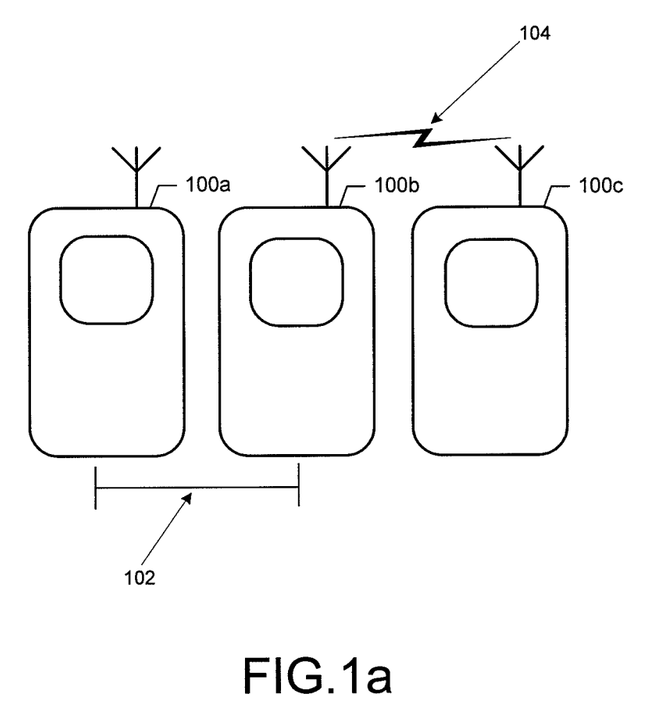
FIG. 1a is an illustration of devices proximate to each other in accordance with various embodiments of the present invention.

FIG. 1a is an illustration of devices proximate to each other in accordance with various embodiments of the present invention. As used herein, the term "proximate" may be used to indicate that two objects are near, adjacent to, or within a predefined radius of each other. In some examples, the term "proximate" may indicate that two objects are within a radius of one foot/twelve inches of each other or some other predetermined distance. In this regard, the mobile communications devices 100 (e.g., mobile communications devices 100a, 100b, and 100c) of FIG. 1 may be proximate to each other.

Example embodiments of the present invention include a mobile communications device for detecting that one or more other mobile communications devices are proximate to the mobile communications device. According to various example embodiments, detecting proximity may be performed in a number of ways. For example, in some example embodiments, proximity may be determined based on whether a communications channel 104 has been opened between two devices (e.g., mobile communications device 100b and mobile communications device 100c). Communications channel 104 may be a near field communications (NFC) channel or link, a Bluetooth link, an infrared link, or the like. According to various example embodiments, the signal strength, data rate, or other communications link parameters may be utilized to determine that another device is proximate. In some example embodiments, one or more directional antennas may be employed on a mobile communications device to allow for proximity detection using, for example, signal strength, data rate, or other communications link parameters.

Further, in some example embodiments, mobile communications devices may use location information to determine whether the devices are proximate to each other. In this regard, global positioning system (GPS) data may be used by mobile communications devices configured with GPS functionality to determine a distance 102 between two mobile communications devices (e.g., mobile communications device 100a and mobile communications device 100b). If the distance 102 is with a predefined threshold, then the mobile communications devices may be proximate to each other. In some exemplary embodiments, proximity detection may be performed using information derived from historical GPS coordinate data, such as speed and direction of travel.

Further, example embodiments of the present invention may also provide for a mobile communications device to determine the location of the one or more other communications devices relative to the location of the communications device as part of detecting proximity. In this regard, a mobile communications device may be configured to determine whether another mobile communications device is near or next to the device, and which side the other mobile communications device is on. In this regard, mobile communications device 100b may be configured to determine that mobile communications device 100a is on the left, and mobile communications device 100c is on the right. As such, a mobile communications device may detect that another mobile communications device is proximate to the mobile communications device and is on the left-hand side, right-hand side, a top side, a bottom side, a front side or a back side of the mobile communications device. The relative location of the other device may be determined again via GPS or signal parameters (e.g., signal strength, data rate, wave orientation, etc.) of an open communication link (e.g., Bluetooth link, infrared link, other near field communications link, or the like). In some example embodiments, one or more directional antennas may be employed on a mobile communications device to allow for relative location detection using, for example, signal strength, data rate, or other communications link parameters.

Upon determining that two devices are proximate to each other, the functionality of the proximate devices may be altered. In this regard, based on the applications currently being executed by the mobile communications devices (e.g., the context of the mobile communication devices), and more particularly based on the data being acted upon by the applications, various functionality in accordance with embodiments of the present invention may be implemented. In this regard, the proximate devices may communicate indications of active data via a peer-to-peer communications connection or via a network communications connection. Active data may be data that a mobile communications device is currently or has recently acted upon. For example, active data may be a song being played by a media player application, search terms entered into a search application, user-defined points of interest currently depicted by a mapping application, selected contact information included in a contact list application, or other user-selected data. In some example embodiments, a user may select the active data by selecting a collection of data. The collection of data may be analyzed to identify similarities among the members of the collection and the indications of active data to be transmitted to another device may include the similarities.

In this regard, in some example embodiments, one of the two or more proximate mobile communications devices may have the role of the leader device. Determination of which device is the leader device may be determined in any number of ways. In one exemplary embodiment, relative movement of the devices may be used to determine the leader device. For example, if a first device is stationary and a second device moves such that the device are now proximate each other, the stationary device may be the leader device.

A leader device may be configured to dictate an operation mode of the other proximate devices (follower devices). In this regard, a leader device may define or initiate an operation mode, which may cause follower devices to also enter the same operation mode. For example, if a leader device is executing a music player application in an active mode, the leader device may cause the follower devices to also execute a music player application or a related music sharing application.

Indications of active data from the leader device may be shared with the other proximate devices. The follower devices may perform analyses on the provided indications of active data. Analyses of the active data may include searches associated with the active data, identifying locations of active data on a mapping application, or the like. Searches based on the active data may be configured to identify data that is similar to, or has a relationship with, the active data. Searches may identify data common to one or more devices (intersecting data), data that is located on only one of the devices (complement data), or the like.

For example, consider a scenario where mobile communications device 100*b* is the leader device and mobile communications device 100*b* is currently playing a song by an artist. Mobile communications device 100*b* may communicate indications of the active data (e.g., the song title, the artist, the current playback point in the song, a data file including the song, and/or metadata or tag data associated with the song) to the follower devices, namely mobile communications devices 100*a* and 100*c*. The follower devices may be configured to analyze the received active data by, for example, performing a search of the data stored on the respective devices using the indications of active data as search parameters. In this regard, the results of the search may indicate similar data stored on the follower devices, such as, photos of the artist, other songs by the artist, other songs on an album, videos of the artist (e.g., music videos, interviews, etc.), or the like. In some example embodiments, a search may be limited to a data format of the active data. In this regard, results of the analysis may include only data that is formatted in a same manner as the active data (e.g., only audio files may be returned). Additionally, for example, when the leader device continues to a next song in a playlist, new indications of active data may be communicated to the follower devices and new analyses of the active data may be performed.

Also, as described briefly above, the leader device may define or initiate operation mode changes that affect the operation mode of the follower devices. If the leader device is in a map application, the follower devices may also initiate a maps application or a related application (e.g., a contacts application to identify locations of contacts on a map). Similarly, if the leader device is in an image gallery application, the follower devices may also initiate an image gallery application or a related application. Further, in another example, a leader device may be currently performing a search of data. The follower device may be configured to perform the same search using the same search criteria, possibly against the data stored on a memory device of the follower devices. In general, when the leader device changes operation modes (e.g., applications), the follower devices may also be configured to also change operation modes.

The results of the analysis may be presented to the users of the follower devices via respective user interfaces that may include a display. In some exemplary embodiments, the results of the analysis may be presented on the leader device as well, or an aggregate of the analyses of a number of follower devices may be generated and presented on the user interfaces of all the proximate devices. In some example embodiments, the results of the analysis between two or more devices are shown on an external screen not associated with any of the proximate devices or a user interface of another device that is not proximate. In this regard, for example, a television screen, monitor, or other external device having a user interface may present the results of the analysis.

Example embodiments of the present invention also facilitate sharing data identified as a result by communicating selected data to another proximate mobile communications device. For example, a user of a device having a touch screen display may use touch gestures to send the identified data to another proximate device.

In some exemplary embodiments, a follower device may, additionally or alternatively, provide data to the leader device for analysis. The leader device may analyze the data and instruct the follower device to display particular data on a user interface of the follower device.

In some example embodiments of the present invention, active data need not be provided by a leader device, but rather may be other data that is common to the devices, such as the current location. Since the devices are proximate to each other, the devices may be said to be at substantially the same location with respect to particular applications and the current location may be the active data used to perform an analysis. For example, if the proximate devices are currently located in the city of London, an analysis, such as a search, of data on each of the proximate devices may be performed to identify photos that have been taken in the city of London. In this manner, sharing of the location related photos may be facilitated.

Figure 1B:
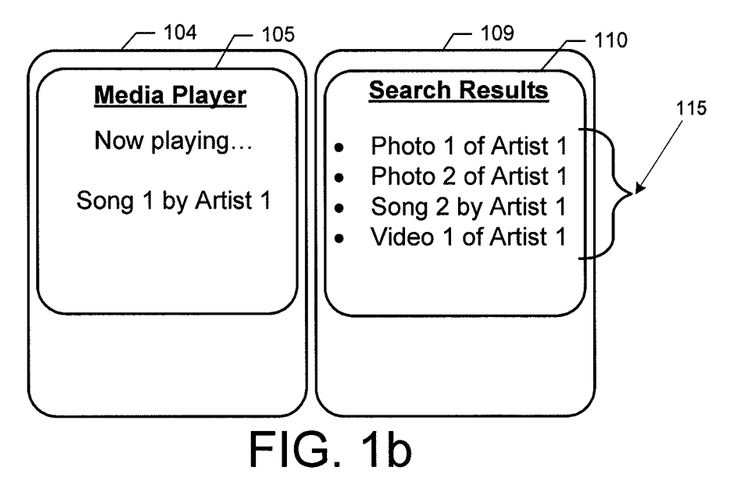
FIGS. 1b-1f are illustrations of displays of proximate devices displaying results of an analysis according to various exemplary embodiments of the present invention.

FIGS. 1*b*-1*f* depict example displays of proximate devices and provide examples of the types of analyses that may be performed in accordance with embodiments of the present invention. Further, FIGS. 1*b*-1*f* depict example manners for displaying results of analyses in accordance with embodiments of the present invention. FIG. 1*b* depicts a display 105 of device 104 and a display 110 of device 109, where device 104 and device 109 are proximate devices. In the scenario of FIG. 1*b*, the device 104 is playing song 1 by artist 1. Since the device 109 is proximate to device 104, device 104 may transmit data about song 1 and/or artist 1 to be received by device 109. Device 109 may be configured to perform a search of the data stored on device 109 and present the results 115 on display 110. In this example scenario, the results 115 have various data formats and include two photos, a song and a video.

Figure 1C:
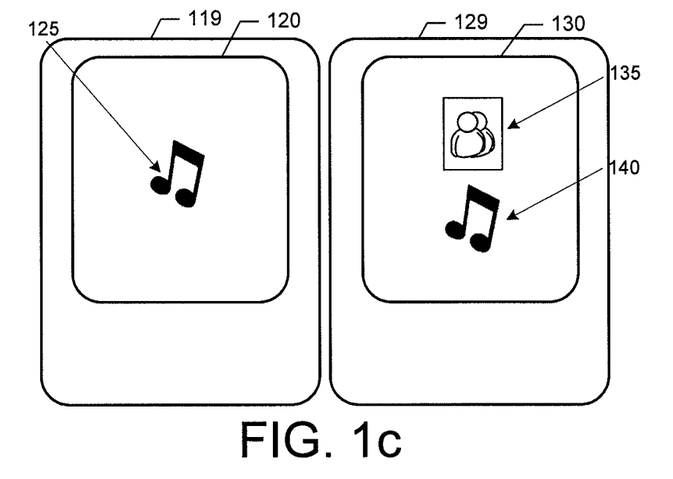

FIG. 1*c* depicts a display 120 of device 119 and a display 130 of device 129, where device 119 and device 129 are proximate devices. In the scenario of FIG. 1*c*, the user of device 125 has selected, but need not be playing, a song file 125. Note however, according to various embodiments the song file need not have been selected, but rather may have been visible on the display of the device. By selecting the song file 125, possibly from a file manager application or a media content manager application, the song file 125 may become active data, and data associated with the song file 125 (e.g., indications of active data) may be communicated to device 129. Device 129 may be configured to perform a search of the data stored on device 129 and present the results on display 110. In the example scenario of FIG. 1*c*, the results are a thumbnail photo 135 and a second song file 140 that have a relationship with the song file 125.

Figure 1D:
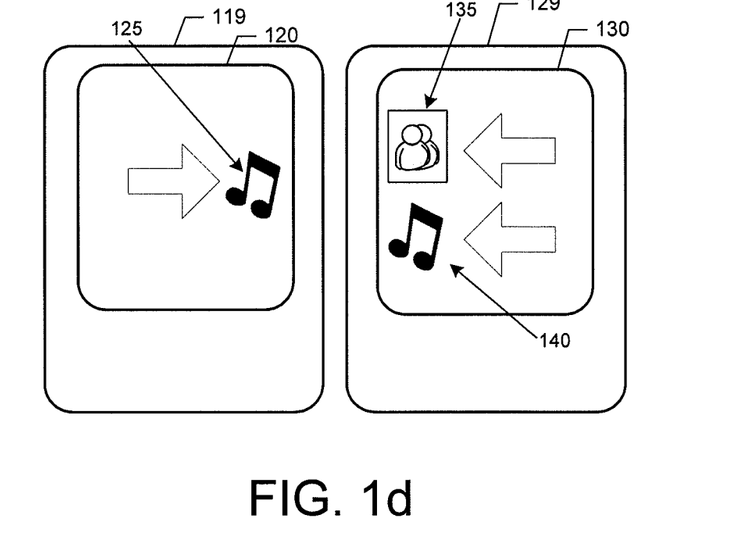

FIG. 1*d* illustrates an example manner of displaying results of the search performed in the scenario of FIG. 1*c*. In this regard, as described above, the devices 119 and 129 may have determined their relative locations. Based on the relative location information, the devices may be configured to display the results of the search (e.g., the thumbnail photo 135 and the second song file 140) and the selected song file 125 as moving across the display screen in the direction of the other device (as indicated by the arrows). In this regard, the results may move across the display as though a magnetic force were pulling the results toward the other device. The movement of the representations of data towards each other provides an indication that the search results are related to the active data (e.g., the song file 125).

Figure 1E:
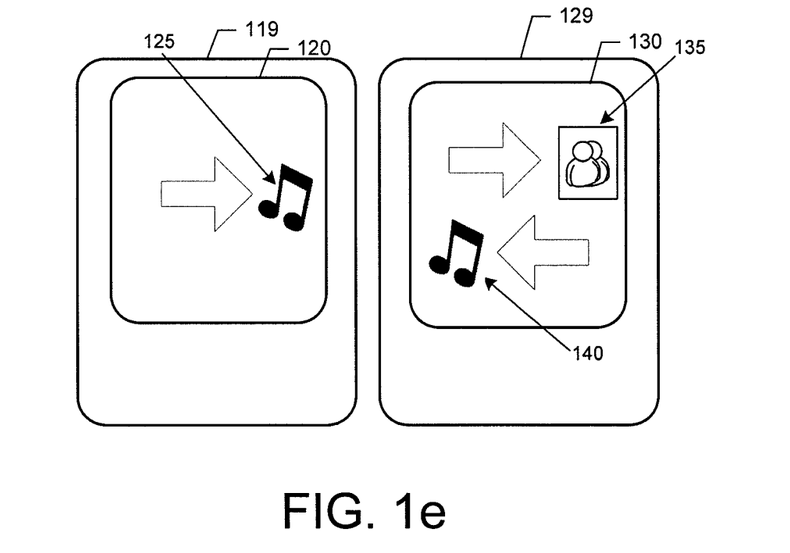

FIG. 1*e* illustrates another search scenario similar to that of FIG. 1*c*, but where a data format criterion has been included as a search parameter. In this regard, the data format of the scenario is a song file, and as such, the second song file 140 meets the criterion, but the thumbnail photo 135 does not. Therefore, in accordance with some example embodiments of the present invention, the second song file 140 may move across the display 130 toward the device 119 and the thumbnail photo 135 may move across the display 130 away from the device 119.

Figure 1F:
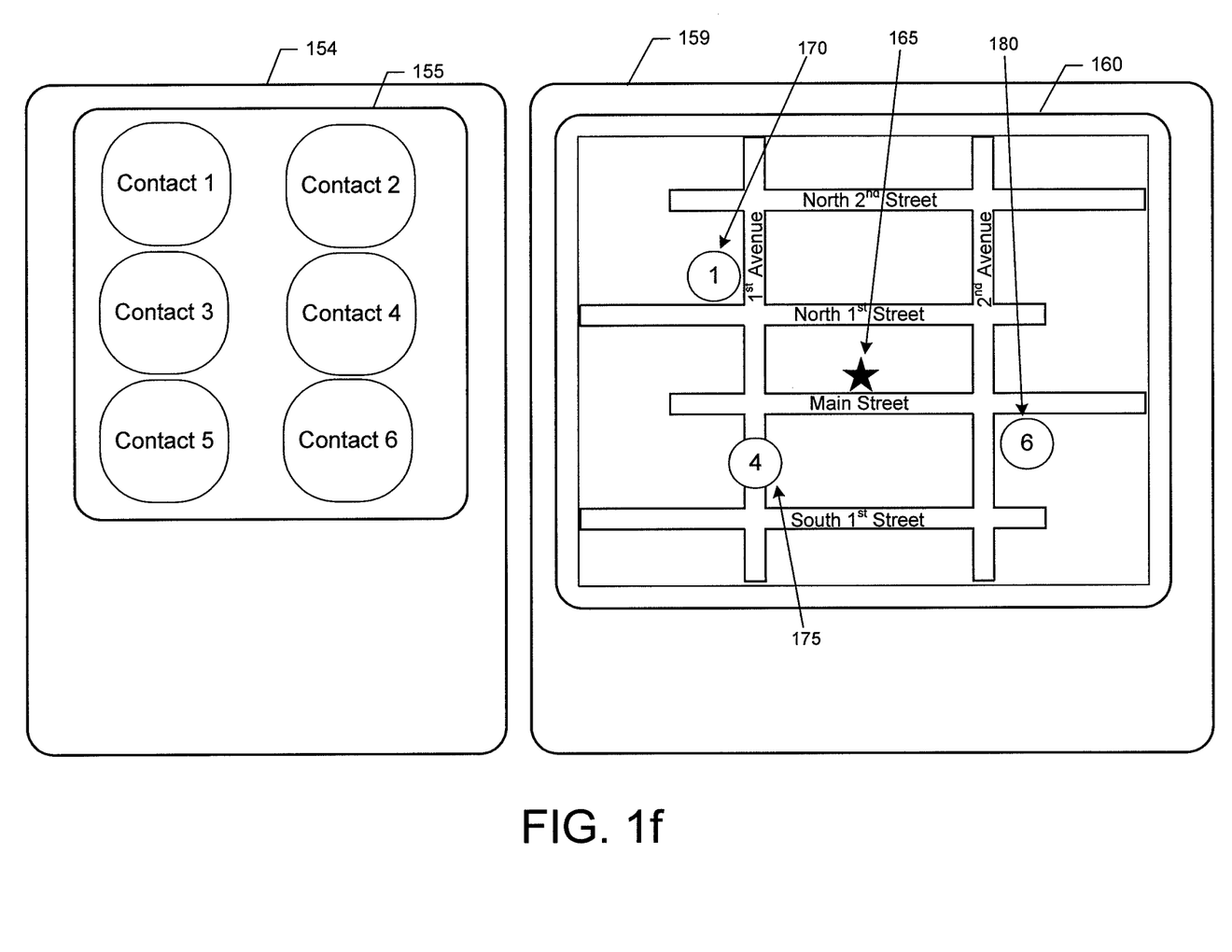

FIG. 1*f* illustrates an alternative analysis that may be performed on active data with respect to mapping locations and points of interest (e.g., locations of friends, family members, museums, tourist attractions, or the like). In this regard, the devices 154 and 159 of FIG. 1*f* are proximate each other. Further, the user of device 154 has selected Contacts 1-6, or may have merely been viewing the Contacts 1-6 via a display, and as such the Contact 1-6 may be defined as active data. The user may have been viewing the Contacts 1-6 in an effort to determine the location of the Contacts 1-6. Each contact may be representative of an individual that may be a friend of the user of device 154. Device 159 may receive data associated with the Contacts 1-6 and analyze the data. In particular, device 159 may request, for example, from a service via a network connection, location coordinates of the Contacts 1-6. Device 159 may be configured to analyze the coordinates and display icons representative of the Contacts that are nearby in a mapping application. In this regard, icon 165 may be the current location of the device 159. Icons 170, 175, and 180 may be displayed at locations on the map that correspond with where the Contacts 1, 4, and 6 are actually located. In other example embodiments, points of interest derived from data on both device 154 and device 159 may be presented on the display 160.

Figure 2:
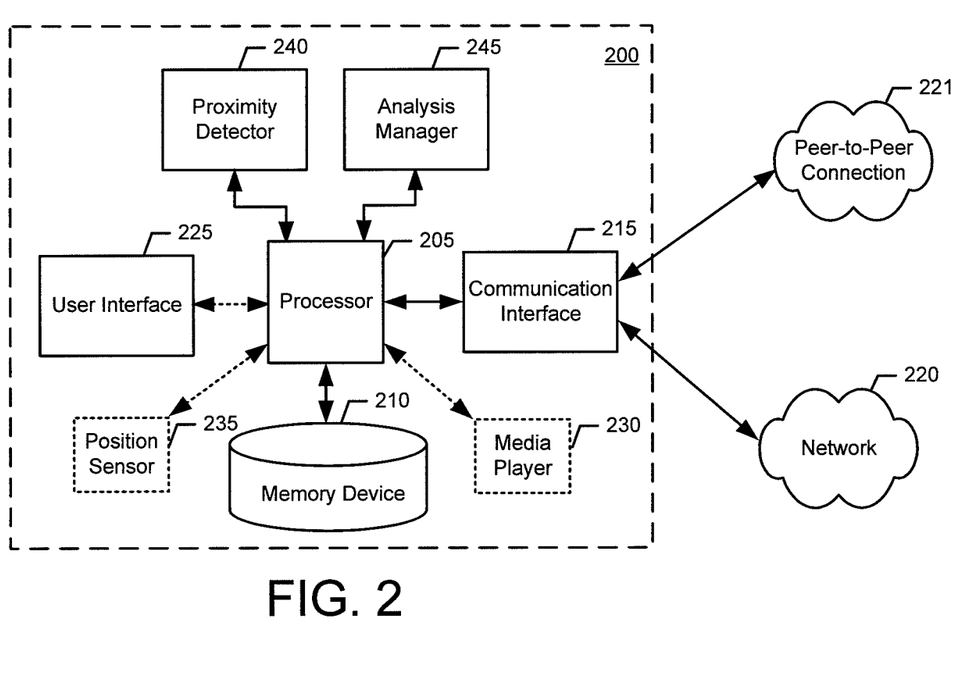
FIG. 2 is a schematic block diagram of an apparatus for analyzing data associated with proximate devices according to various example embodiments of the present invention.

FIG. 2 illustrates an example apparatus 200 that may provide for analyzing data associated with proximate devices as described herein, which may be an example of a mobile communications device described with respect to FIGS. 1*a*-1*f*. In some example embodiments, the apparatus 200 may be embodied as, or included as a component of, a computing device and/or a communications device with wired or wireless communications capabilities. Some examples of the apparatus 200 may include a computer, a server, a mobile terminal such as, a mobile telephone, a portable digital assistant (PDA), a pager, a mobile television, a gaming device, a mobile computer, a laptop computer, a camera, a video recorder, an audio/video player, a radio, and/or a global positioning system (GPS) device, a network entity such as an access point such as a base station, or any combination of the aforementioned, or the like. Further, the apparatus 200 may be configured to implement various aspects of the present invention as described herein including, for example, various example methods of the present invention, where the methods may be implemented by means of a hardware or software configured processor, computer-readable medium, or the like.

The apparatus 200 may include or otherwise be in communication with a processor 205, and a memory device 210, which may, but need not include read-only memory storage for a public identifier 211. Further, in some embodiments, such as embodiments where the apparatus 200 is a mobile terminal, the apparatus 200 may also include a communications interface 215, a user interface 225, a position sensor 235 and/or a media player 230. The processor 205 may be embodied as various means including, for example, a microprocessor, a coprocessor, a controller, or various other processing devices including integrated circuits such as, for example, an ASIC (application specific integrated circuit), an FPGA (field programmable gate array), or a hardware accelerator. In an example embodiment, the processor 205 is configured to execute instructions stored in the memory device 210 or instructions otherwise accessible to the processor 205. Processor 205 may also be configured to facilitate communications via the communications interface by, for example, controlling hardware and/or software included in the communications interface.

The memory device 210 may be configured to store various information involved in implementing embodiments of the present invention such as analysis results (e.g., hardware certificates and common configuration certificates). The memory device 210 may be a computer-readable storage medium that may include volatile and/or non-volatile memory. For example, memory device 210 may include Random Access Memory (RAM) including dynamic and/or static RAM, on-chip or off-chip cache memory, and/or the like. Further, memory device 210 may include non-volatile memory, which may be embedded and/or removable, and may include, for example, read-only memory, flash memory, magnetic storage devices (e.g., hard disks, floppy disk drives, magnetic tape, etc.), optical disc drives and/or media, non-volatile random access memory (NVRAM), and/or the like. Memory device 210 may include a cache area for temporary storage of data. In this regard, some or all of memory device 210 may be included within the processor 205.

Further, the memory device 210 may be configured to store information, data, applications, computer-readable program code instructions, or the like for enabling the processor 205 and the apparatus 200 to carry out various functions in accordance with example embodiments of the present invention. For example, the memory device 210 could be configured to buffer input data for processing by the processor 205. Additionally, or alternatively, the memory device 210 may be configured to store instructions for execution by the processor 205.

The user interface 225 may be in communication with the processor 205 to receive user input at the user interface 225 and/or to provide output to a user as, for example, audible, visual, mechanical or other output indications. The user interface 225 may include, for example, a keyboard, a mouse, a joystick, a display (e.g., a touch screen display), a microphone, a speaker, or other input/output mechanisms. In some example embodiments, the display of the user interface 225 may be configured to present results of an analysis performed in accordance with embodiments of the present invention.

The communication interface 215 may be any device or means embodied in either hardware, software, or a combination of hardware and software that is configured to receive and/or transmit data from/to a network and/or any other device or module in communication with the apparatus 200. In this regard, the communication interface 215 may include, for example, an antenna, a transmitter, a receiver, a transceiver and/or supporting hardware, including a processor or software for enabling communications with network 220 or via a peer-to-peer connection 221. Via the communication interface 215, the apparatus 200 may communicate with various other network entities. Further, in some example embodiments, the communications interface 215 may be configured to facilitate detection of a proximate device as described above.

The communications interface 215 may be configured to provide for communications in accordance with any wired or wireless communication standard. For example, communications interface 215 may be configured to provide for communications in accordance with second-generation (2G) wireless communication protocols IS-136 (time division multiple access (TDMA)), GSM (global system for mobile communication), IS-95 (code division multiple access (CDMA)), third-generation (3G) wireless communication protocols, such as Universal Mobile Telecommunications System (UMTS), CDMA2000, wideband CDMA (WCDMA) and time division-synchronous CDMA (TD-SCDMA), 3.9 generation (3.9G) wireless communication protocols, such as Evolved Universal Terrestrial Radio Access Network (E-UTRAN), with fourth-generation (4G) wireless communication protocols, international mobile telecommunications advanced (IMT-Advanced) protocols, Long Term Evolution (LTE) protocols including LTE-advanced, or the like. Further, communications interface 215 may be configured to provide for communications in accordance with techniques such as, for example, radio frequency (RF), infrared (IrDA) or any of a number of different wireless networking techniques, including WLAN techniques such as IEEE 802.11 (e.g., 802.11a, 802.11b, 802.11g, 802.11n, etc.), wireless local area network (WLAN) protocols, world interoperability for microwave access (WiMAX) techniques such as IEEE 802.16, and/or wireless Personal Area Network (WPAN) techniques such as IEEE 802.15, BlueTooth (BT), ultra wideband (UWB) and/or the like.

The apparatus 200 may further include a position sensor 235 such as, for example, a global positioning system (GPS) module in communication with the processor 205. The position sensor 235 may be any means, device or circuitry for locating the position of apparatus 200. The position sensor 235 may include all hardware for locating the position of apparatus 200. Alternatively or additionally, the position sensor 235 may utilize a memory device of the apparatus 200 (e.g., memory device 210) to store instructions for execution by the processor 205 in the form of software to determine the position of apparatus 200. The position sensor 235 may include or otherwise alternatively be embodied as, for example, an assisted global positioning system (Assisted-GPS) sensor, or a positioning client, which may be in communication with a network device to receive and/or transmit information, such as a sky or floor sensor, or the like for use in determining a position of the apparatus 200. In this regard, the position of the apparatus 200 may be determined by GPS, as described above, cell ID, signal triangulation, or other mechanisms as well. In one example embodiment, the position sensor 235 includes a pedometer or inertial sensor. In this regard, position sensor 235 may include the functionality to operate as a motion sensor to detect motion and a direction of motion associated with the apparatus 235. In some embodiments, the positioning sensor may also include an accelerometer, a gyroscope, a magnetometer, a horizon sensor, and/or the like. As such, the position sensor 235 may be capable of determining a location of the apparatus 200, with respect to, for example, longitudinal and latitudinal directions, and an altitude direction of the apparatus 200, or a position relative to a reference point such as a destination or start point.

The media player 230 may be representative of an application that could be implemented by apparatus 200. The media player 230 may be configured to facilitate playing media items on the apparatus 200. The media player 230 may be any means or device embodied in hardware, software, or a combination of hardware and software, such as processor 205 implementing software instructions or a hardware configured processor 205, that is configured to facilitate the playback of media items via a user interface, such as the user interface 225. In this regard, the processor 205 may include, or otherwise control the media player 230. The media player 230 may be configured to receive a media item, such as in the form of a data file, from memory device 210, network 220, or the like, and play the media item. In some exemplary embodiments, media player 230 may be configured to receive a media item as a data stream via the network 220 and play the media item. The media item may be played by controlling the user interface 225 to allow a user to experience the media item. For example, the media player 230 may be configured to receive a music track, and play the music track through speakers included in the user interface 225. The media player 230 may also be configured to receive a playlist, and play media items in accordance with the playlist.

The proximity detector 240 and the analysis manager 245 of apparatus 200 may be any means or device embodied in hardware, software, or a combination of hardware and software, such as processor 205 implementing software instructions or a hardware configured processor 205, that is configured to carry out the functions of proximity detector 240 and/or analysis manager 245 as described herein. In an example embodiment, the processor 205 may include, or otherwise control proximity detector 240 and/or analysis manager 245. In various example embodiments, proximity detector 240 and/or analysis manager 245 may reside on differing apparatuses such that some or all of the functionality of proximity detector 240 and/or analysis manager 245 may be performed by a first apparatus, and the remainder of the functionality of proximity detector 240 and/or analysis manager 245 may be performed by one or more other apparatuses.

The proximity detector 240 may be configured to detect that another device is proximate to the apparatus 200 and, in some example embodiments, the relative location of another device. In some example embodiments, the proximity detector 240 may be configured to detect that a near field communications channel or link between the other device and the apparatus 200 has been opened. Further, the proximity detector 240 may be configured to verify that location information of the other device is within a threshold distance of the apparatus 200.

The analysis manager 245 may also be configured to receive or transmit indications of active data from/to one or more proximate devices. In some example embodiments, the active data may be data that is currently being presented by a user interface of a proximate device.

The analysis manager 245 may also be configured to perform an analysis of the indications of active data. In some example embodiments, being configured to perform an analysis may include being configured to perform a search based on the indications of the active data. In this regard, the search may be of data stored on a memory device that is local to apparatus 200, such as the memory device 210. In some example embodiments, the analysis manager 245 may be configured to perform a search based on the active data to identify data having a data format in common with the active data. In this regard, data formats may be photo files, video files, audio files, word processing files, presentation files, contact data, and/or subsets thereof. Further, in some example embodiments, the analysis manager 245 may also be configured to identify a location of a point of interest described by the active data.

The analysis manager 245 may also be configured to cause a user interface of the apparatus 200 (e.g., user interface 225) to present results of the analysis. Additionally or alternatively, the analysis manager 245 may cause a user interface of another device, possibly a non-proximate device, to present results of the analysis. In this regard, the analysis manager 245 may be configured to cause the user interface 225 of the apparatus 200 to display the results of the analysis. The analysis manager 245 may also be configured to cause the results to be presented as moving across the display of the user interface 225 in a direction of the first device. Further, in some example embodiments, the analysis manager 245 may be configured to cause a user interface of the apparatus 200 to cause a representation of a point of interest to be displayed on a map. The analysis manager 245 may also be configured to provide for transferring data corresponding to a selected result of the analysis to another device.

Figure 3:
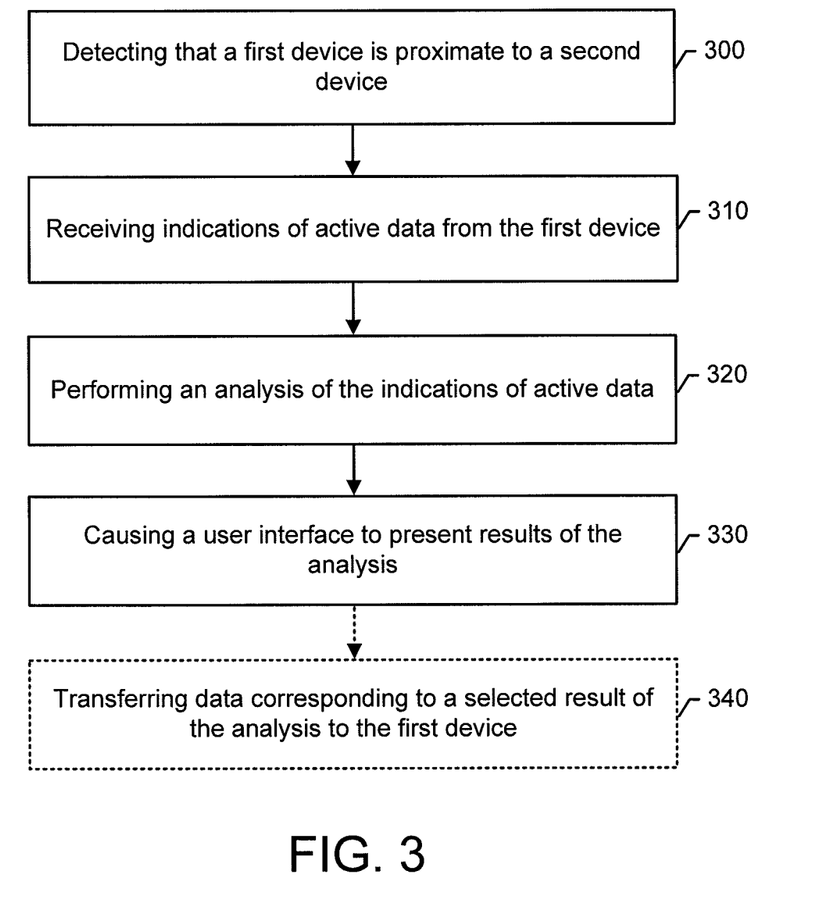
FIG. 3 is a flowchart of a method for analyzing data associated with proximate devices according to various example embodiments of the present invention.

FIG. 3 illustrates a flowchart of a system, method, and computer program product according to example embodiments of the invention. It will be understood that each block, step, or operation of the flowchart, and/or combinations of blocks, steps, or operations in the flowchart, may be implemented by various means. Example means for implementing the blocks, steps, or operations of the flowchart, and/or combinations of the blocks, steps or operations in the flowchart include hardware, firmware, and/or software including one or more computer program code instructions, program instructions, or executable computer-readable program code instructions. Example means for implementing the blocks, steps, or operations of the flowchart, and/or combinations of the blocks, steps or operations in the flowchart also include a processor such as the processor 205. The processor may, for example, be configured to perform the operations (300-340) by performing hardware implemented logical functions, executing stored instructions, or executing algorithms for performing each of the operations. Alternatively, an example apparatus may comprise means for performing each of the operations of the flowchart. In this regard, according to an example embodiment, examples of means for performing operations 300-3400 include, for example, the processor 205, the proximity detector 240, the analysis manager 245, and/or an algorithm executed by the processor 205 for processing information as described above.

In one example embodiment, one or more of the procedures described herein are embodied by program code instructions. In this regard, the program code instructions which embody the procedures described herein may be stored by or on a memory device, such as memory device 210, of an apparatus, such as apparatus 200, and executed by a processor, such as the processor 205. As will be appreciated, any such program code instructions may be loaded onto a computer, processor, or other programmable apparatus (e.g., processor 205, memory device 210) to produce a machine, such that the instructions which execute on the computer, processor, or other programmable apparatus create ate means for implementing the functions specified in the flowchart's block(s), step(s), or operation(s). In some example embodiments, these program code instructions are also stored in a computer-readable storage medium that directs a computer, a processor, or other programmable apparatus to function in a particular manner, such that the instructions stored in the computer-readable storage medium produce an article of manufacture including instruction means which implement the function specified in the flowchart's block(s), step(s), or operation(s). The program code instructions may also be loaded onto a computer, processor, or other programmable apparatus to cause a series of operational steps to be performed on or by the computer, processor, or other programmable apparatus to produce a computer-implemented process such that the instructions which execute on the computer, processor, or other programmable apparatus provide steps for implementing the functions specified in the flowchart's block(s), step(s), or operation(s).

Accordingly, blocks, steps, or operations of the flowchart support combinations of means for performing the specified functions, combinations of steps for performing the specified functions, and program code instruction means for performing the specified functions. It will also be understood that, in some example embodiments, one or more blocks, steps, or operations of the flowchart, and combinations of blocks, steps, or operations in the flowchart, are implemented by special purpose hardware-based computer systems or processors which perform the specified functions or steps, or combinations of special purpose hardware and program code instructions.

FIG. 3 depicts a flowchart describing an example method for analyzing data associated with proximate devices. At 300, the method may include detecting that a first device is proximate to a second device. In some example embodiments, detecting that a first device is proximate to a second device includes detecting that a near field communications channel between the first device and the second has been opened. Additionally or alternatively, detecting that the first device is proximate to the second device may comprise verifying that location information of the first device is within a threshold distance of the second device.

The example method may also include transmitting or receiving indications of active data from the first device at 310. In this regard, in some example embodiments, receiving the indications of active data includes the active data being data that is currently being presented by a user interface of the first device.

Further, the example method may include performing an analysis of the indications of active data at 320. The analysis may be performed by a processor configured to perform the analysis. In some example embodiments, performing the analysis includes performing a search based on the indications of active data. The search may be of data stored on a memory device of the second device. In some example embodiments, the search may be performed based on the active data to identify data having a data format in a common with the active data. Additionally or alternatively, performing the analysis may include identifying a location of a point of interest described by the active data.

The example embodiment may also include causing a user interface to present results of the analysis at 330. In some example embodiments, the user interface is a user interface of the second device. Further, in some example embodiments, presenting results of the analysis may include displaying the results of the analysis on a display and causing the results to be presented as moving across the display in a direction of the first device. Further, in some example embodiments, causing the user interface to present results of the analysis includes causing a representation of the point of interest to be displayed on a map. In some example embodiments, the example method may also include transferring data corresponding to a selected result of the analysis to the first device at 340.

In yet another example embodiment, an apparatus for analyzing data associated with proximate devices is provided. The example apparatus includes means for detecting that a first device is proximate to a second device and means for receiving indications of active data from the first device. The example apparatus furthers include means for performing an analysis of the indications of active data, and means for causing a user interface to present results of the analysis. In some embodiments, means for performing an analysis of the indications of the active data include means for perform a search based on the active data.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

What is claimed is:

1. A method comprising:
   determining that a first device is proximate to a second device;
   causing, at least in part, by a processor associated with the first device, an analysis of indications of active data that is currently being presented by a user interface of the second device, the analysis including performing a search for data on the first device that corresponds to the active data;
   causing, at least in part, a presentation of results of the search in a user interface of the first device concurrently with the user interface of the second device presenting the active data;
   determining an orientation of the user interface of the first device with respect to the second device; and
   causing, at least in part, the user interface of the first device to present the results of the search automatically moving across the user interface of the first device in a direction of the second device based, at least in part, on the orientation when the analysis indicates that the results of the search include data that are common to the first device and the second device.

2. The method of claim 1, further comprising:
   determining movement information that indicates that the first device is moved towards the second device while the second device is stationary; and
   determining that the second device is a leader device based, at least in part, on the movement information,
   wherein the second device is configured to transmit the indications of the active data to the first device when the second device is the leader device.

3. The method of claim 1, wherein determining that the first device is proximate to the second device comprises determining that a near field communications channel between the first device and the second device has been opened.

4. The method of claim 1, wherein determining that the first device is proximate to the second device comprises determining that location information of the first device defines a location of the first device to be within a threshold distance of the second device.

5. The method of claim 1, further comprising:
   causing, at least in part, the user interface of the first device to present at least a portion of the results of the analysis moving across the user interface opposite to the direction of the second device based, at least in part, on the orientation when the analysis indicates that the results of the search include data that are not common to the first device and the second device.

6. The method of claim 1, wherein the analysis includes identifying a location of a point of interest described by the active data, the method further comprising:
   causing, at least in part, a presentation of a representation of the point of interest on a map of the user interface of the first device.

7. The method of claim 1, wherein a search criteria of the search includes a data format of the active data.

8. The method of claim 7, wherein the active data is associated with a song currently playing on the second device, and the search is based on an artist, an album, one or more videos, or a combination thereof on the first device associated with the song.

9. The method of claim 1 further comprising causing, at least in part, a transfer of data corresponding to a selected result of the search to the second device.

10. An apparatus comprising:
    at least one processor; and
    at least one memory including computer program code for one or more programs, the at least one memory and the computer program code configured to, with the at least one processor, cause the apparatus to perform at least the following,
    determine that the apparatus is proximate to a device;
    cause, at least in part, an analysis of indications of active data that is currently being presented by a user interface of the device, the analysis including performing a search for data on the apparatus that corresponds to the active data;
    cause, at least in part, a presentation of results of the search in a user interface of the apparatus concurrently with the user interface of the device presenting the active data;
    determine an orientation of the user interface of the apparatus with respect to the device; and
    cause, at least in part, the user interface of the apparatus to present the results of the search automatically moving across the user interface of the apparatus in a direction of the device based, at least in part, on the orientation when the analysis indicates that the results of the search include data that are common to the apparatus and the device.

11. The apparatus of claim 10, wherein the apparatus is further caused to:
    determine movement information that indicates that the apparatus is moved towards the second device while the device is stationary; and
    determine that the device is a leader device based, at least in part, on the movement information,
    wherein the device is configured to transmit the indications of the active data to the apparatus when the device is the leader device.

12. The apparatus of claim 10, wherein the determination that the apparatus is proximate to the device comprises determining that a near field communications channel between the apparatus and the device has been opened.

13. The apparatus of claim 10, wherein the determination that the apparatus is proximate to the device comprises determining that location information of the device defines a location of the device to be within a threshold distance of the apparatus.

14. The apparatus of claim 10, wherein the apparatus is further caused to:
    cause, at least in part, the user interface of the apparatus to present at least a portion of the results of the analysis moving across the user interface opposite to the direction of the device based, at least in part, on the orientation when the analysis indicates that the results of the search include data that are not common to the apparatus and the device.

15. The apparatus of claim 10, wherein the analysis includes identifying a location of a point of interest described by the active data, wherein the apparatus is further caused to:
    cause, at least in part, a presentation of a representation of the point of interest on a map of the user interface of the apparatus.

16. The apparatus of claim 10, wherein a search criteria of the search includes a data format of the active data.

17. The apparatus of claim 16, wherein the active data is associated with a song currently playing on the device, and the search is based on an artist, an album, one or more videos, or a combination thereof on the apparatus associated with the song.

18. The apparatus of claim 10, wherein the apparatus is further caused to cause a transfer of data corresponding to a selected result of the search to the device.

19. A non-transitory computer-readable storage medium carrying one or more sequences of one or more instructions which, when executed by one or more processors, cause an apparatus to at least perform the following steps:
    determine that the apparatus is proximate to a device;
    cause, at least in part, an analysis of indications of active data that is currently being presented by a user interface of the device, the analysis including performing a search for data on the apparatus that corresponds to the active data;
    cause, at least in part, a presentation of results of the search in a user interface of the apparatus concurrently with the user interface of the device presenting the active data;
    determine an orientation of the user interface of the apparatus with respect to the device; and
    cause, at least in part, the user interface of the apparatus to present the results of the search automatically moving across the user interface of the apparatus in a direction of the device based, at least in part, on the orientation when the analysis indicates that the results of the search include data that are common to the apparatus and the device.

20. The non-transitory computer-readable storage medium of claim 19, wherein the apparatus is further caused to:
    determine movement information that indicates that the apparatus is moved towards the second device while the device is stationary; and
    determine that the device is a leader device based, at least in part, on the movement information,
    wherein the device is configured to transmit the indications of the active data to the apparatus when the device is the leader device.

21. The non-transitory computer-readable storage medium of claim 19, wherein the determination that the apparatus is proximate to the device comprises determining that a near field communications channel between the apparatus and the device has been opened.

22. The non-transitory computer-readable storage medium of claim 19, wherein the determination that the apparatus is proximate to the device comprises determining that location information of the apparatus defines a location of the apparatus to be within a threshold distance of the device.

23. The non-transitory computer-readable storage medium of claim 19, wherein the apparatus is further caused to:
    cause, at least in part, the user interface of the apparatus to present at least a portion of the results of the analysis moving across the user interface opposite to the direction of the device based, at least in part, on the orientation when the analysis indicates that the results of the search include data that are not common to the apparatus and the device.

24. The non-transitory computer-readable storage medium of claim 19, wherein the analysis includes identifying a location of a point of interest described by the active data, wherein the apparatus is further caused to:
    cause, at least in part, a presentation of a representation of the point of interest on a map of the user interface of the apparatus.

25. The non-transitory computer-readable storage medium of claim 19, wherein a search criteria of the search includes a data format of the active data.

26. The non-transitory computer-readable storage medium of claim 25, wherein the active data is associated with a song currently playing on the device, and the search is based on an artist, an album, one or more videos, or a combination thereof on the apparatus associated with the song.

27. The non-transitory computer-readable storage medium of claim 19, wherein the apparatus is further caused to transfer data corresponding to a selected result of the search to the device.

* * * * *